United States Patent [19]

Aoki et al.

[11] Patent Number: 4,675,821
[45] Date of Patent: Jun. 23, 1987

[54] METHOD AND APPARATUS FOR DETECTING KNOCKING

[75] Inventors: Keiji Aoki; Shinichiro Tanaka, both of Susono, Japan

[73] Assignee: Toyota Jidosha Kabushiki Kaisha, Aichi, Japan

[21] Appl. No.: 880,114

[22] Filed: Jun. 30, 1986

Related U.S. Application Data

[63] Continuation of Ser. No. 467,807, Feb. 18, 1983, abandoned.

[51] Int. Cl.⁴ .............................................. F02P 5/14
[52] U.S. Cl. ................ 364/431.08; 123/425; 123/435; 73/35
[58] Field of Search ............ 364/431.08; 123/425, 123/435; 73/35

[56] References Cited

U.S. PATENT DOCUMENTS

| | | | |
|---|---|---|---|
| 4,271,469 | 6/1981 | Kawai et al. | 364/431.08 |
| 4,300,503 | 11/1981 | Deleris et al. | 123/425 |
| 4,334,422 | 6/1982 | Kawai et al. | 364/431.08 |
| 4,347,820 | 9/1982 | Deleris | 123/425 |
| 4,355,534 | 10/1982 | Roger | 73/35 |
| 4,356,551 | 10/1982 | Iwase et al. | 364/431.08 |
| 4,384,473 | 5/1983 | Brandt | 73/35 |
| 4,385,607 | 5/1983 | Honiden et al. | 123/425 |
| 4,476,709 | 10/1984 | Hattori et al. | 73/35 |
| 4,477,875 | 10/1984 | Suzuki et al. | 364/431.08 |
| 4,478,068 | 10/1984 | Bonitz et al. | 73/35 |

OTHER PUBLICATIONS

Walton et al, Analog to Digital Converter, Mar. 1965 pp. 881-885, IBM Technical Disclosure Bulletin vol. 7, No. 10.

Wang, Improve μC Data Acquisition Capability, Aug. 5, 1981, EDN vol. 26, No. 15, pp. 156-157.

Primary Examiner—Parshotam S. Lall
Attorney, Agent, or Firm—Kenyon & Kenyon

[57] ABSTRACT

An element is provided which operates in two selectable mode. The element converts the analog output of a knock sensor to a digital value in one mode and compares the analog output with the reference value in the other mode. The average output of the knock sensor is calculated from the digital value and the reference is calculated from the average output. In the occurrence of any knocking, the output of the knock sensor is greater than the reference.

5 Claims, 10 Drawing Figures

METHOD AND APPARATUS FOR DETECTING KNOCKING

This application is a continuation of application Ser. No. 467,807, filed Feb. 18, 1983, now abandoned.

BACKGROUND OF THE INVENTION

1. Field of the Invention

This invention relates to a method and apparatus for detecting knocking in an electronically controlled engine provided with a microprocessor.

2. Description of the Prior Art

Since vibration caused by knocking has a high frequency, it was necessary for prior knock detecting apparatus to detect mechanical vibration of an engine body or pressure in a combustion chamber with a knock sensor and analog-to-digital (A/D) convert the output of the knock sensor with a high speed A/D converter having, for example, a conversion time of several $\mu$ seconds for high speed processing of the A/D converted value with a CPU. The high speed type A/D converter and CPU were very expensive, placing the apparatus at a cost disadvantage.

SUMMARY OF THE INVENTION

An object of the present invention is to provide a method and apparatus which can detect knocking accurately knocking without using high speed type elements.

A method of the present invention for accomplishing this object comprises generating an analog signal representing mechanical vibration of an engine, or gas pressure in a combustion chamber of the engine; converting the analog signal to a first digital signal at predetermined intervals of time; and, generating, from first digital signals, a second digital signal representing an average value of the analog signal. The method further includes generating a digital reference signal from the second digital signal; converting the digital reference signal to an analog reference signal; and, determining knocking in the engine by comparing the analog signal with the analog reference signal.

An apparatus according to the present invention comprises first means for generating an analog signal representing mechanical vibration of an engine, or gas pressure in a combustion chamber of the engine; second means, coupled to the first means, for providing output signals indicating whether or not a voltage of an analog reference signal is greater than a voltage of the analog signal; and, third means, coupled to the second means, for, in a first mode, converting the analog signal at predetermined intervals to a first digital signal, for, in the first mode, generating, from first digital signals, a second digital signal representing an average value of the analog signal, and for, in a second mode, generating knock pulse count signals from the output signals of the second means. The apparatus further includes fourth means, coupled to the third means, for switching the third means between the first and second modes; fifth means, coupled to the third means and the second means, for generating a digital reference signal from the second digital signal; and, sixth means, coupled between the second and fifth means, for converting, during the second mode of the third means, the digital reference signal to the analog reference signal.

Thus, A/D conversion of the analog output of the knock sensor is carried out for figuring out the average value, and the occurrence of knocking is detected by comparing the analog output of the knock sensor with the analog reference value. Accordingly, the analog output of the knock sensor does not need to be A/D converted with high speed, so that a knock detecting apparatus can be designed having a relatively low speed element.

Preferably the period of the occurrence of knocking is detected from a period during which the analog output of the knock sensor is larger than the analog reference value.

Preferably the value of a knock pulse counter from which value a knock strength is detected is increased by 1 when the analog output of the knock sensor in the previous time detection is smaller than the analog reference value and the analog output of the knock sensor in the present time detection is larger than the analog reference value. While knocking continues, the analog output of the knock sensor is successively maintained at a vlaue larger than the analog reference value. The value of the knock pulse counter can be increased by 1 for one knocking with the comparison between the previous and present time analog outputs and the analog reference value.

Preferably spark timing is corrected in relation to the knock strength.

For a better understanding of the invention, and to show more clearly how the same may be carried into effect, reference will now be made, by way of example, to the accompanying drawings.

DETAILED DESCRIPTION OF PREFERRED EMBODIMENTS

Figure 1:
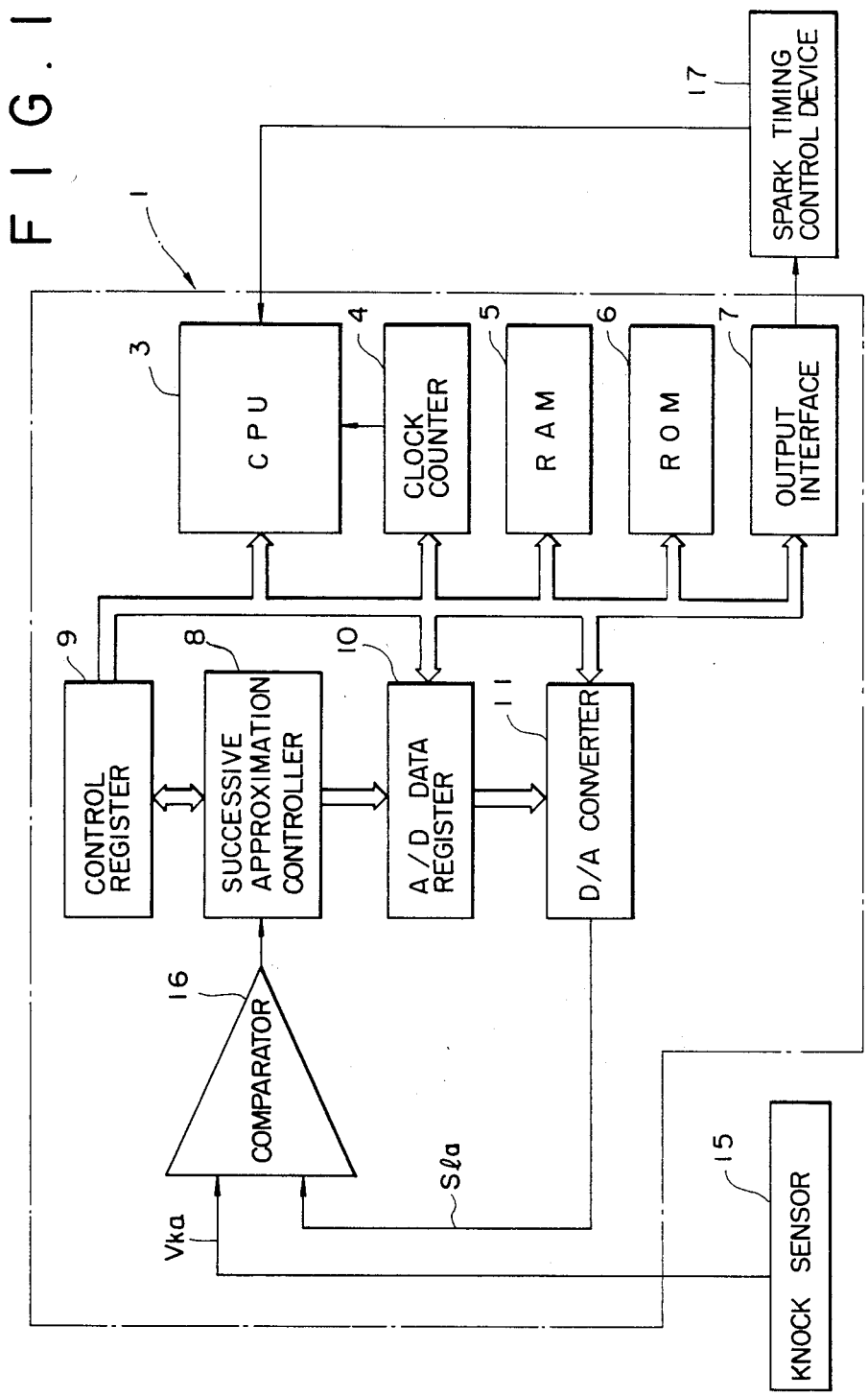
FIG. 1 is a block diagram of an embodiment according to the present invention.

FIG. 1 is a block diagram showing the interior of a knock detecting apparatus including a microcomputer 1. An address data bus 2 interconnects a CPU 3, clock counter 4, RAM 5, ROM 6, output interface 7, control register 9 for determining operating mode of a successive approximation controller 8, A/D data register 10 for storing A/D converted data of the successive approximation controller 8 and data from CPU 3 and D/A converter 11 for D/A converting digital data from A/D data register or CPU. The successive approximation controller 8 has A/D mode for a first function of A/D converting the analog input voltage of a comparator 16 and a sense mode for a second function of comparing the analog input voltage of the comparator 16 with a predetermined analog reference value. The analog output voltage VKa of a knock sensor 15 mounted on an engine body to deect mechanical vibration of the engine body or gas pressure in a combustion chamber is compared with the analog reference value from D/A converter 11 by the comparator 16. The output of the comparator 16 is sequentially sent to the successive approximation controller 8 and becomes 1 when the analog output of the knock sensor 15 is larger than the analog output of D/A converter 11 and becomes 0 when the former is smaller than the latter. A spark timing control device 17 containing a coil receives knock strength signals from the output interface 7 to correct spark advance angle value corresponding to the knock strength and generate a high voltage at a spark timing corresponding to the corrected advance angle value. Spark signals of the spark timing control device 17 are sent from said device 17 to CPU 3 as interrupting signals.

Figure 2:
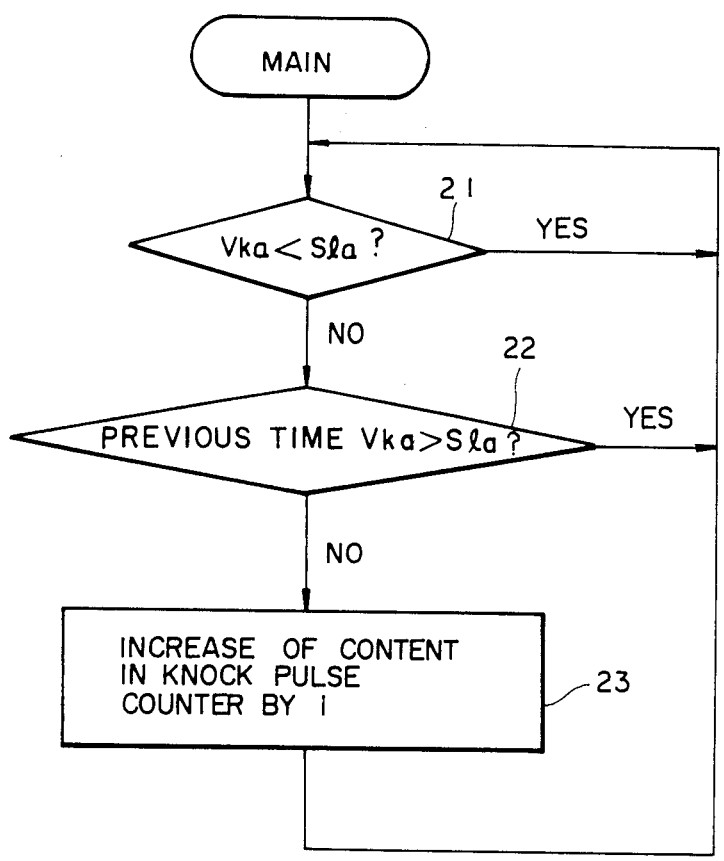
FIG. 2 is a flow chart of a main program.

FIG. 2 is a flow chsart of a program for counting the knock pulse number (a plurality of knock pulses are generated during one occurrence of knocking). This program is implemented as a main program. In step 21, whether or not the analog output voltage Vka of the knock sensor 15 is smaller than the analog output Sla of D/A converter 11 is judged.

If Vka<Sla, the step 21 is again performed and if Vka≧Sla, advance is made to step 22. Sla is the D/A converter value of Sld, as set in step 29 shown in FIG. 3. In the performance of the main program the successive approximation controller 8 operates in the second function, i.e. sense mode, in response to signals from the control register 9. If Vka≧Sla, the output of the comparator 16 is 1 and if Vka<Sla the output of the comparator 16 is 0. These 1, 0 outputs are sent to the control register 9 through the successive approximation controller 8 to be stored therein. Thus, whether or not Vka<Sla can be determined by 1 or 0 stored in the control register 9. In step 22, whether or not the previous time value of Vka is larger than Sla is judged. If Vka is larger than Sla, retreat is made to step 21 and if Vka is not larger than Sla, advance is made to step 23. In step 23, the content of the knock pulse counter is increased by 1. While the amplitude of Vka is increased by the occurrence of knocking to exceed Sla, the number of times of knocking providing Vka>Sla is counted as the number of knock pulses. By step 22, more than one increases in the value of the knock pulse counter for one knock pulse can be avoided.

Figure 3:
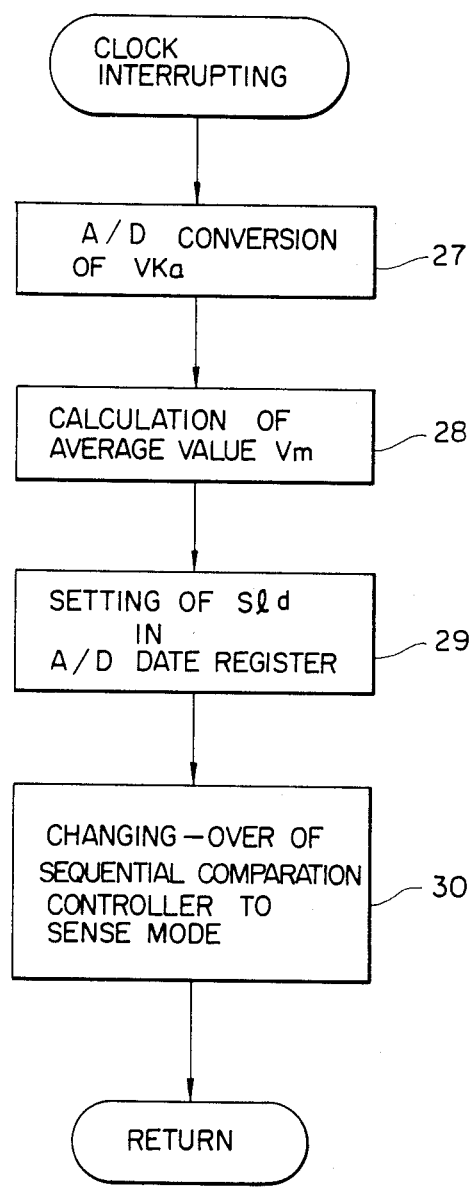
FIG. 3 is a flow chart of a clock interrupting program.

FIG. 3 is a flow chart of a program implemented periodically with a predetermined period, by interrupting signals from the clock counter 4. In step 27, signals are sent to the control register 9 to change over the successive approximation controller 8 to A/D mode and to A/D convert the analog output voltage Vka of the knock sensor 15. This A/D converting system will be described later with reference to FIG. 6. A commercially available type of the microcomputer 1 takes several ten μ seconds for A/D conversion. In step 28, the average value Vm of Vka (digital representation) is figured out on the basis of the digital value Vkd of Vka. For example, Vm is figured out according to the following recursion formula;

$$\frac{C_1 \cdot Vm + c_2 \cdot |Vkd|}{C_1 + c_2} \rightarrow Vm$$

where c1, c2 are constants and c1>c2. That is, the new value of Vm, on the right, is generated by utilizing the old value of Vm in the expression on the left. $C_1$ and $C_2$ are selected weights, with $C_1 > C_2$ so that the value Vm is given more weight than the value |Vkd|. In step 29, Sld is set in the A/D data register 10. Sld is figured out in step 37 shown in FIG. 4. In step 30, signals are sent to the control register 9 to change over the successive approximation controller 8 to sense mode whereby the analog reference value Sla of Sld subjected to D/A conversion is sent from D/A converter 11 to the comparator 16.

Figure 4:
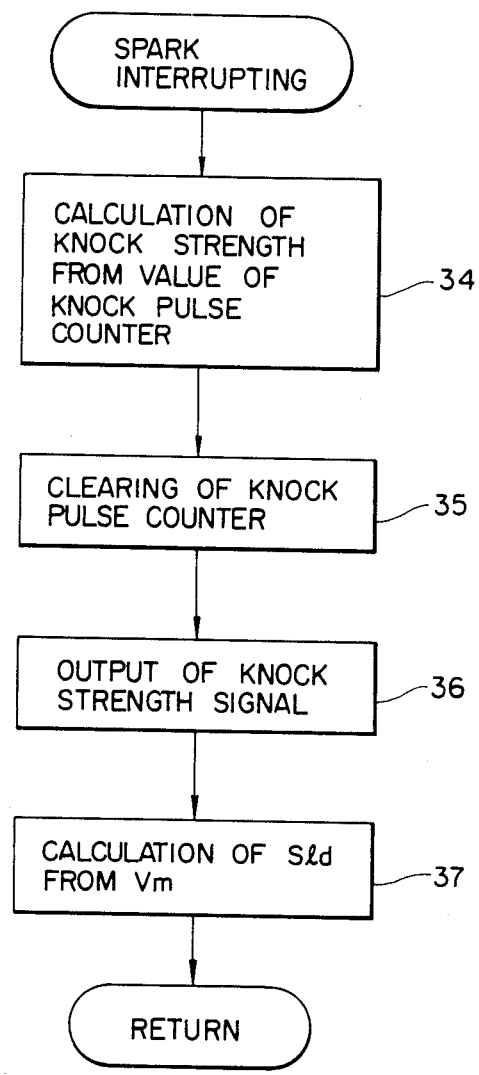
FIG. 4 is a flow chart of a spark interrupting program.

FIG. 4 is a flow chart of a program implemented accompanying interruption by spark signals from the spark timing control device 17. In step 34, the value counted by the knock pulse counter, i.e. the number of knock pulses, is converted to the knock strength. In step 35, the knock pulse counter is cleared. In step 36, knock strength signals are generated from the output of the output interface 7. The knock strength signals are used for correcting spark timing. In step 37, Sld is figured out of the average value Vm and for example represented as $Sld = k \cdot Vm$ (provided k is a constant).

Figure 5:
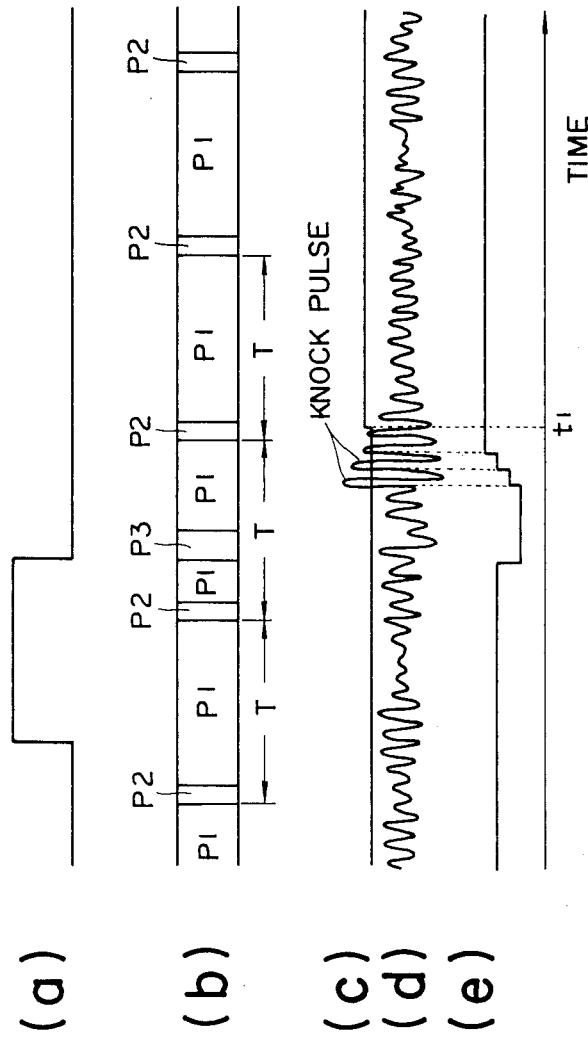
FIGS. 5(a)-5(e) constitute a timing chart of the apparatus shown in FIG. 1.

FIG. 5 is a timing chart of an embodiment. (a) is a spark signal sent from the spark timing control device 17 to CPU 3 as interrupting signal. (b) is a program being performed in CPU 3, P1 showing the main program in FIG. 2, P2 showing the clock interrupting program in FIG. 3 and P3 showing the spark interrupting program in FIG. 4. P2 is performed at predetermined intervals of time T, and P3 is performed with the fall of the pulse of the spark signal. (c) is the output voltage Sla of D/A converter 11 when the successive approximation controller is in the sense mode. The output voltage Sla is updated along with the performance of P2 after the performance of P3 (time t1). (d) is the output voltage of the knock sensor. (e) is the value counted by the knock pulse counter and increased by 1 every time the signal of the knock sensor exceeds Sla.

Figure 6:
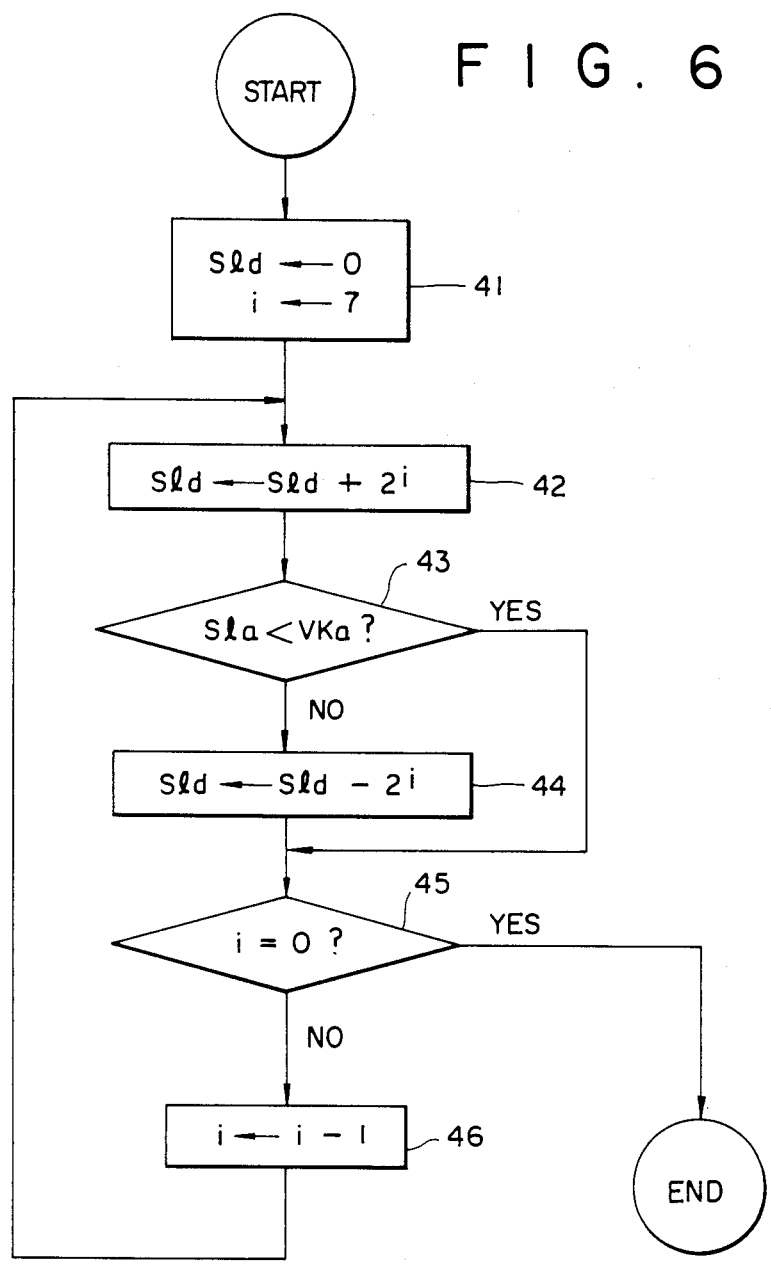
FIG. 6 is a flow chart of A/D converting system in a computer.

FIG. 6 is a flow chart of A/D converting system performed in the computer 1. In the system of the embodiment, Vka is converted to digital value of max. 8 bits. In step 41, 0 is substituted for Sld and 7 for i, respectively. In step 42, $Sld + 2^i$ is substituted for Sld. In step 43, the analog value Sla of Sld is compared with Vka by the comparator 16. If Sla≧Vka, advance is made to step 44 and if Sla<Vka, advance is made to step 45 through step 44. Thus, the actual value of Vka is not required by the controller 8 in this algorithm; step 43 only requires the "0" or "1" output of the comparator 16 generated by a comparison of Vka with Sla. In step 44, $Sld - 2^i$ is substituted for Sld. Thus, when the i-th bit of digital value of Vka is 0, step 44 is performed. $2^i$ added to Sld in step 42 is subtracted in step 44 so that $2^i$ does not remain is Sld. Also, when the i-th bit of the digital value of Vka is 1, step 44 is passed through, and $2^i$ added to Sld in step 42 remains in Sld. In step 45 whether or not i=0 is judged. A/D conversion is completed if i=0 and if i≠0, i−1 is substituted for i and step 42 is again performed.

It will be apparent to those skilled in the art that various modifications and variations could be made in the transmission of the invention without departing from the scope or spirit of the invention.

What is claimed is:

1. A method for detecting knocking in an engine, comprising:
    (a) generating a continuous analog voltage signal representing mechanical vibration of said engine, or gas pressure in a combustion chamber of said engine;
    (b) periodically converting instantaneous voltage values of said analog signal to successive first digital signals at predetermined intervals of time;
    (c) periodically generating, from a plurality of successive first digital signals, a second digital signal representing an average value of said analog voltage signal;

(d) generating successive digital reference signals from said successive second digital signals;

(e) converting said successive digital reference voltage signals to a continuous analog reference voltage signal;

(f) comparing said analog voltage signal with said analog reference voltage signal between the times of said periodic analog to digital and digital to analog conversions; and (g) generating a knocking signal when the value of said analog voltage signal bears a predetermined relation to the value of said analog voltage reference signal as an indication of engine knocking.

2. A method as in claim 1 wherein step (g) includes increasing a knock pulse count by one if the value of said analog voltage signal is not less than the value of said analog reference voltage signal in the present time, and if the value of said analog voltage signal was not greater than the value of said analog reference voltage signal the previous time.

3. A method as in claim 2 further comprising the steps of:

generating knock strength signals from said knock pulse count; and, correcting spark timing by using said knock strength signals.

4. An apparatus for detecting knocking in an engine, comprising:

first means, for generating a continuous analog voltage signal representing mechanical vibration of said engine, or gas pressure in a combustion chamber of said engine;

second means, coupled to said first means, for providing output signals indicating whether or not a value of said analog voltage signal is less than a value of an analog reference voltage signal;

third means, coupled to said second means, said third means having a first mode for converting a value of said analog voltage signal to a first digital signal, for generating, from a plurality of successive first digital signals, a second digital signal representing an average value of said analog signal, and for generating a digital reference signal from said second digital signal; and a second mode for generating knock pulse count signals from said output signals of said second means;

fourth means, coupled to said third means, for switching said third means from said second mode to said first mode at predetermined intervals; and fifth means, coupled between said third means and said second means, for converting, during said second mode of said third means, said digital reference signal to said analog reference voltage signal.

5. An apparatus as in claim 4 wherein said third means generates a knock pulse count signal if the value of said analog voltage signal is not less than the value of said analog reference voltage signal in the present time, and if the value of said analog voltage signal is not greater than the value of said analog reference voltage signal the previous time.

* * * * *